May 17, 1960 V. W. PETERSON ET AL 2,936,655
SELF-ALIGNING PLANETARY GEARING
Filed Nov. 4, 1955 2 Sheets-Sheet 1

Inventors
Victor W. Peterson
& Paul Borzce
By Paul Fitzpatrick
Attorney

May 17, 1960     V. W. PETERSON ET AL     2,936,655
SELF-ALIGNING PLANETARY GEARING

Filed Nov. 4, 1955     2 Sheets-Sheet 2

Inventors
Victor W. Peterson
& Paul Bancel
By Paul Fitzpatrick
Attorney

United States Patent Office 2,936,655
Patented May 17, 1960

2,936,655

SELF-ALIGNING PLANETARY GEARING

Victor W. Peterson and Paul Bancel, Indianapolis, Ind., assignors to General Motors Corporation, Detroit, Mich., a corporation of Delaware Application November 4, 1955, Serial No. 544,995

12 Claims. (Cl. 74—801)

Our invention relates to planetary gearing, particularly to planetary reduction gears of high power capacity to weight ratio such as are used in the drive from gas turbine aircraft engines to propellers. The invention is primarily directed to the provision of such gearing which is self-aligning so as to equalize loads on the teeth of the gears. By virtue of the invention unequal distribution of loads between different portions of the teeth axially of the gear, which may result from inevitable inaccuracies in machining and from distortion of the structure with variations in load, are eliminated or minimized. As a result, the structures may be made much lighter for given power capacity and the endurance of the gear is greatly improved.

The principal objects of the invention are to provide improved, lighter, and more reliable planetary gearing and to provide planetary gearing which is self-aligning so as to accommodate gear tooth contact to distortions under load and manufacturing tolerances.

By way of brief introduction to the nature of the invention in its preferred embodiment, the gearing comprises a sun gear, a planet carrier mounting a number of planet gears meshing with the sun gear, and an internally toothed ring gear meshing with the planet gears. The axis of the planet carrier is fixed and the centers of the planet gears are fixed with respect to the carrier, but the axes of the planet gears can swing universally with respect to the carrier. The ring gear is mounted so as to be held against rotation but with limited freedom for movement radially of the planet carrier axis and swinging movement relative to that axis. The sun gear is mounted with slight freedom for radial movement on its shaft. As a result, the sun gear and ring gear are located by the planet gears which, in turn, are located by the planet carrier. The planet pinion axes can swing in any direction to accommodate the tooth contact between the planet gears and the other two gears to the relative positions of these gears.

This flexible self-aligning structure is accomplished with a minimum of mechanical complexity and weight.

The nature of the invention and the advantages thereof will be more clearly apparent from the succeeding detailed description of the preferred embodiment of the invention with reference to the accompanying drawings in which.

Figure 1:
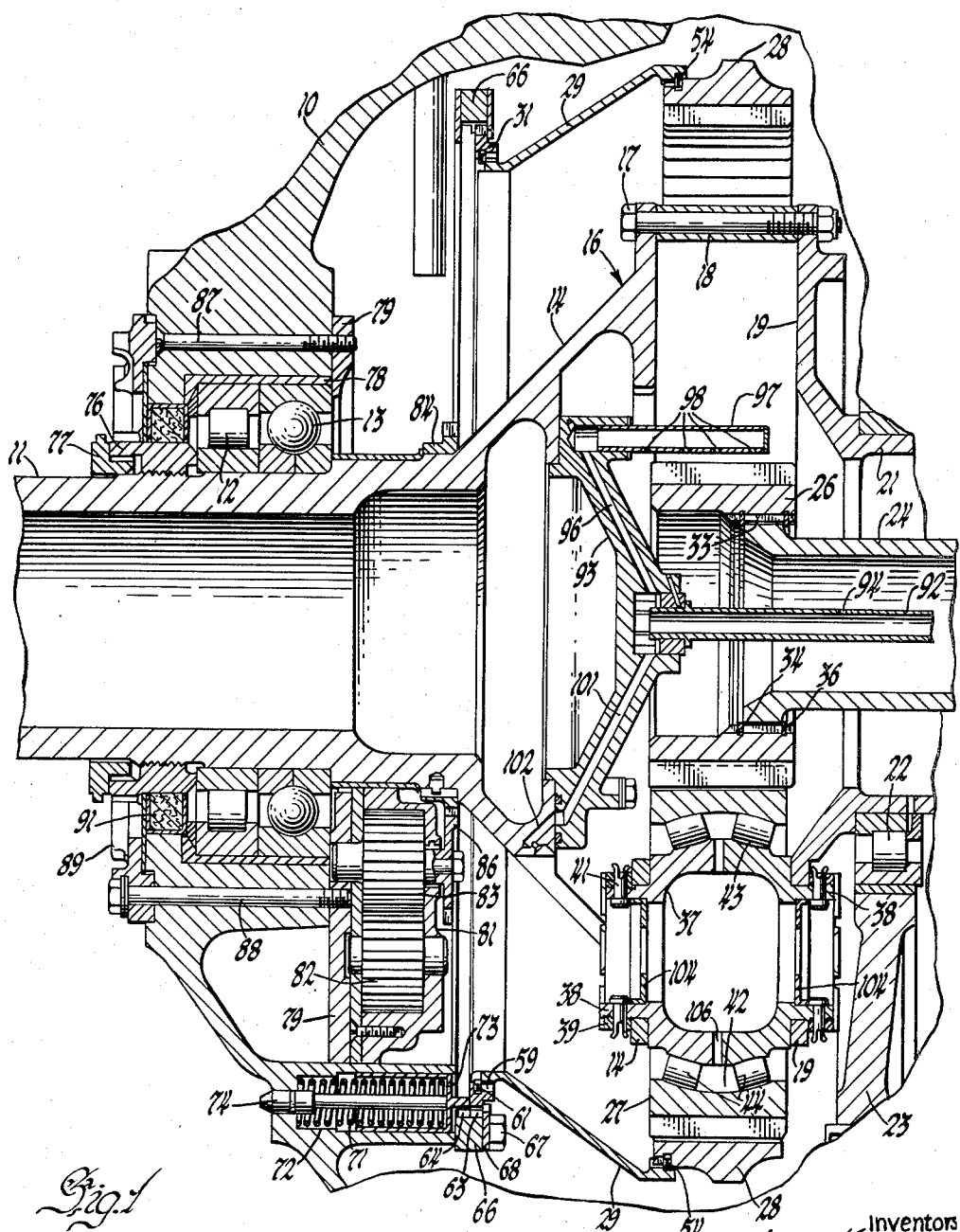
Figure 1 is a sectional view of a planetary reduction gear taken on a plane containing the axis of the gearing.

Referring to Figure 1, the reduction gear is housed in a case 10 which is shown in part. Projecting from the nose of the case is a hollow propeller shaft 11 mounted in a radial bearing 12 and a thrust bearing 13. The propeller shaft 11 is integral with the forward cone or spider 14 of a planet carrier indicated generally by 16. Spider 14 is fixed by bolts 17 and spacer sleeves 18 to the rear spider 19 which is integral with a stub shaft 21 rotatably mounted in a radial bearing 22 supported by diaphragm 23 of the case. It will be seen, therefore, that the propeller shaft and the planet carrier constitute a unitary structure rotatable about the axis defined by bearings 12 and 22. Power is supplied to the gearing by a hollow shaft 24 on which is mounted the sun gear 26. The sun gear meshes with planet gears 27, preferably five in number, rotatably mounted in the planet carrier 16. The planet gears in turn mesh with a non-rotatable ring gear 28 supported by an annular member 29 which connects it to a supporting ring 31 fixed to the reduction gear case.

Considering now the mounting of the gears in more detail, the sun gear 26 and shaft 24 are connected by mating axial splines 33 which are of such degree of looseness as to permit a slight radial movement of the gear with respect to the shaft. The sun gear is held in place by snap rings 34 and 36. The planet gears 27 are mounted on non-rotatable shafts 37 fixed to the front and rear spiders of the planet carrier. The shafts 37 have an enlarged central portion which lies between the spiders 14 and 19 and reduced end portions 38 which fit in bored openings in the spiders and are threaded to receive collars 39 which clamp the spiders against the central portion of the shaft. Collars 39 are locked by rivets 41.

The interior of the planet gear defines a spherical bearing race 42 and the exterior of the shaft 37 defines two concave races 43. Barrel-shaped rollers 44 roll in the races 43 and engage the race 42. As will be apparent, since the rate 42 is spherical, the planet gears may swing universally about their centers. However, the center is fixed with respect to the planet carrier by the two rows of rollers. It may be noted that the shafts 37 are a close fit in the openings in the spiders 14 and 19 which receive them and that these shafts thus provide a rigid connection between the two spiders. Bolts 17 are located between the planet gears and provide an additional connection.

Figure 4:
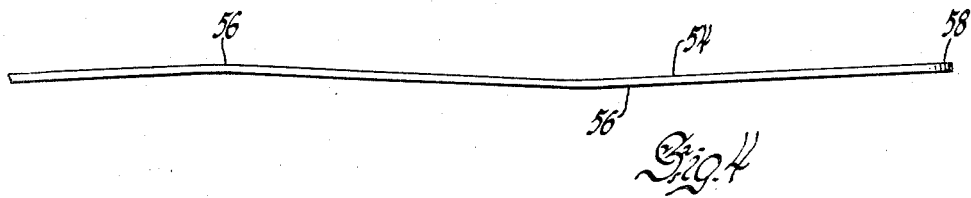
Figure 4 is a partial developed view of an arcuate wavy spring.
Figure 5:
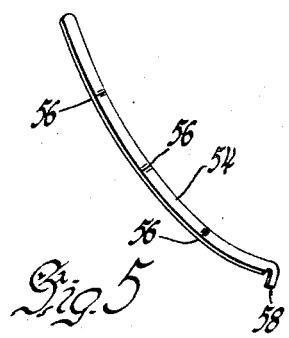
Figure 5 is a perspective view of the spring.

The ring gear 28 is coupled to the annular support 29 and the support to the mounting ring 31 by similar splined connections providing a floating mounting for the ring gear. Since these splined connections are of large diameter and small axial extent, they may swing as well as slide axially, with the result that the ring gear is freely floatable sufficiently to accommodate any needed adjustment. The nature of these connections will be more clearly apparent from the enlarged showing of Figure 2 which shows a fragment of the lower front edge of the ring gear 28. The gear is machined with a groove 46 and the portion adhead of the groove has splines 47. The rear end of the coupling member 29 has splines 51 meshing with the splines 47 and a groove 52 rearwardly of the splines. The rear ends of the splines define rearwardly facing shoulders or abutments. The rear faces of grooves 46 and 52 define forwardly facing abutments. In order to prevent shake or rattle of the parts, four approximately quarter circular wavy springs 54 are lodged in the grooves 46 and 52. These springs are shown also in Figures 4 and 5. Each spring has three slight bends in it indicated at 56 so that, when viewed as in Figure 4, it is an extremely flat W. Thus, with the spring in place, the ends and the central hump 56 engage the rear abutment and the other two humps 56 engage the forward abutment. Since the springs are relatively light and small in comparison to the rest of the structure, they do not offer any substantial resistance to shifting or cocking of the splines.

Figure 2:
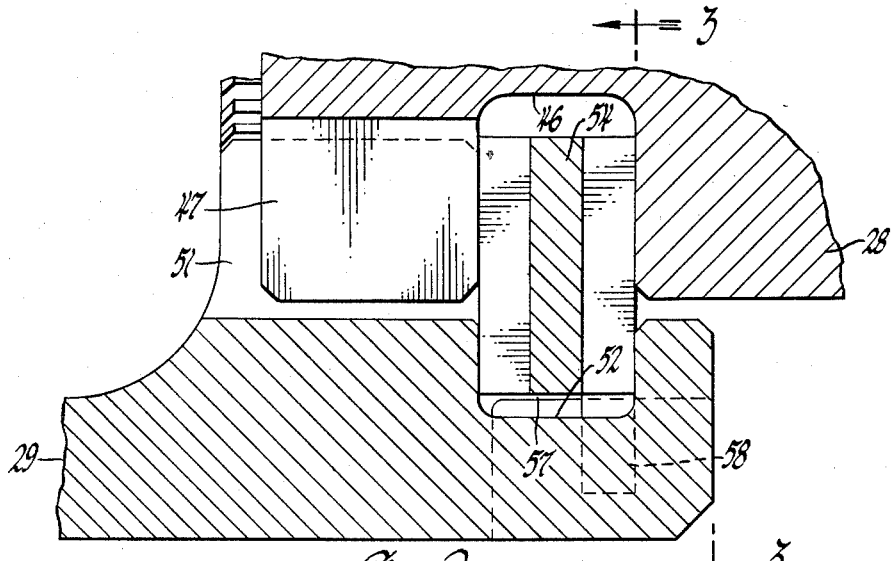
Figure 2 is a greatly enlarged detail sectional view taken on the same plane as Figure 1.
Figure 3:
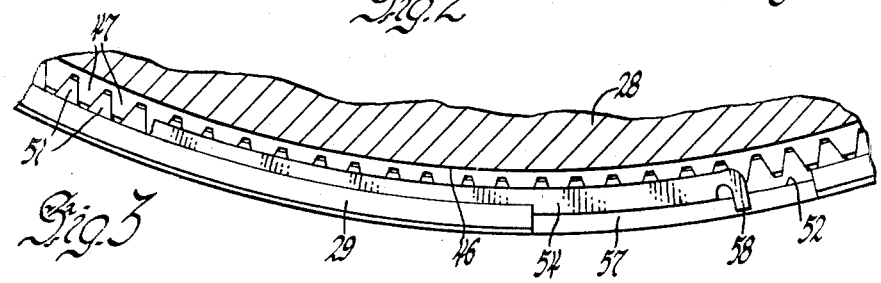
Figure 3 is a fragmentary transverse sectional view taken on the plane indicated by the line 3—3 in Figure 2.

To provide for insertion of the springs 54, the rear edge of the coupling member 29 is cut away at four places as indicated at 57 in Figures 2 and 3. Each spring 54 has a tab 58 by which it may be inserted into or removed from position. Because of the flexibility of the springs, the cut-away portion 57 may be of small circumferential extent.

The connection between coupling member 29 and ring 31 may be identical except for dimensions to that just described and, therefore, will not be described in detail. It comprises a splined connection 59 between the parts and wavy springs 61 providing a bias toward a normal location of the parts but readily yieldable.

For the present, we may assume the ring 31 to be fixed. It will be apparent, therefore, that the five centers of the planet pinions define reference points of location. The sun gear and ring gear are meshed with the planet gears and are located by them. The sun gear may move radially and the ring gear may move radially or swing under the load to provide uniform tooth contact across the face of the teeth. The planet gears also swing if required in any direction. Under the heavy loads carried by a gear of this type, all of the parts will twist to some extent and the invention not only makes the gearing self-centering but compensates for the twist of the planet carrier.

The reduction gear also includes a structure by which negative torque is sensed. By negative torque is meant torque opposite in direction to that when the engine drives the propeller; which may result, for example, if the engine fails and the propeller windmills and drives it through the reduction gear. This structure employs a mounting of the ring gear on helical splines. Referring to Figure 1, the mounting ring 31 for the ring gear is externally helically splined at 63 and is mounted on internal helical splines 64 of a support ring 66 fixed to the reduction gear case by cap screws 67. A stop ring 68 limits rearward movement of ring 31, and its normal position is that shown, in engagement with the stop ring. Ring 31 is biased rearwardly by a number of coil springs 71 mounted in bores 72 in the nose of the case. Each spring acts against a cup 73 slidable in the bore 72 which has a projecting stud engaging the face of the ring 31. One or more of the cups 73 have fixed thereto plungers 74 extending slidably through the nose of the case.

The normal direction of torque biases the ring gear 28, member 29, and ring 31 in the direction to urge the ring 31 rearwardly on the splines. If the torque reverses, the reaction on the ring gear rotates the ring gear slightly, moving the ring 31 forwardly on the splines. The ring gear moves with it, but this is immaterial. As the ring 31 moves forwardly it compresses the springs 71 and projects the plunger 74. The springs are of sufficient strength to hold the ring 31 in its normal position until the negative torque exceeds a predetermined value above that encountered in normal operation of the power plant. The plungers 74 may be coupled by suitable mechanism (not shown) to the propeller to cause it to feather when the negative torque is abnormal.

The propeller shaft bearings 12 and 13 are retained on the shaft by a nut 76 locked against rotation by ring 77 splined both to the propeller shaft and the nut 76. The outer races of the bearings are received in a sleeve 78 retained by plate 79 which also forms part of and supports a gear pump 81 which supplies oil to the reduction gear. The structure of the oil pump is immaterial and will not be described in detail. It comprises gears 82 and 83, the latter of which is driven from the propeller shaft through gears 84 and 86. Plate 79 is retained by bolts 87 and 88, the latter of which also retain a collar 89 which retains an oil seal 91 for the bearings 12 and 13. The details of the seal are not illustrated.

Lubrication of the gears 26, 27, and 28 is effected by oil supplied by the pump 81 through passages not shown to a tube 92 extending through the shaft 24 to an oil distributor disk 93 mounted on the planet carrier spider 14. A small opening 84 in the tube releases oil to the inside of shaft 24 which flows along the inside of the shaft to splines 33. Oil also flows through five radial passages 96 in disk 93 to tubes 97 mounted in the disk which have a number of small orifices 98 through which oil is sprayed onto the sun gear and planet gears. This oil also is carried or flung onto the ring gear.

Five radiating passages 101 in the disk 93 connect to oil jet passages 102 in the forward spider 14 from each of which a jet of oil is discharged into the interior of a hollow pinion shaft 37. Annular oil barriers 104 are mounted in the ends of the shaft so that oil is trapped in the shaft and urged outwardly by rotation thereof. This oil flows through radial bores 105 to the roller bearings 44.

While the invention has been described in terms of a structure in which the ring gear is stationary, it will be apparent that it is immaterial to the invention which, if any, of the several elements, the sun gear, the planet carrier and the ring gear, is stationary. It will also be apparent that many modifications of structure from that disclosed as illustrative of the invention may be made by the exercise of skill in the art and that the detailed description of the preferred embodiment of the invention is not to be construed or limiting or restricting the invention.

We claim:

1. A planetary gear train comprising, in combination, a sun gear mounted with limited freedom for radial movement, a planet carrier mounted on a fixed axis coaxial with the sun gear and positively located axially of the axis, a number of planet gears rotatably mounted on the planet carrier and meshing with the sun gear, the centers of the planet gears being fixed relative to the planet carrier and the planet gears being universally mounted for swinging movement of the planet gear axes relative to the planet carrier, a ring gear meshing with the planet gears, and means mounting the ring gear with freedom for radial and swinging movement with respect to the said fixed axis.

2. A planetary gear train comprising, in combination, a sun gear mounted wtih limited freedom for radial movement, a planet carrier mounted on a fixed axis coaxial with the sun gear and positively located axially of the axis, a number of planet gears rotatably mounted on the planet carrier and meshing with the sun gear, the centers of the planet gears being fixed relative to the planet carrier and the planet gears being universally mounted for swinging movement of the planet gear axes relative to the planet carrier, a ring gear meshing with the planet gears, and means mounting the ring gear with freedom for radial and swinging movement with respect to the said fixed axis comprising a support and a coupling member connected by axially slidable splined connections to the support and the ring gear.

3. A planetary gear train comprising, in combination, a sun gear shaft, a sun gear mounted on the shaft with limited freedom for radial movement, a planet carrier mounted for rotation about a fixed axis coaxial with the sun gear shaft and positively located axially of the axis, a number of planet gears rotably mounted on the planet carrier and meshing with the sun gear, the centers of the planet gears being fixed relative to the planet carrier and the planet gears being universally mounted for swinging movement of the planet gear axis relative to the planet carrier, a ring gear meshing with the planet gears, and means non-rotatably mounting the ring gear with freedom for radial and swinging movement with respect to the said fixed axis.

4. A planetary gear train comprising, in combination, a sun gear mounted with limited freedom for radial movement, a planet carrier mounted on a fixed axis coaxial with the sun gear, a number of planet gears rotatably mounted on the planet carrier and meshing with the sun gear, the centers of the planet gears being fixed relative to the planet carrier and the planet gears being universally mounted for swinging movement of the planet gear axes relative to the planet carrier, a ring gear meshing with the planet gears, and means mounting the ring gear with freedom for radial and swinging movement with respect to the said fixed axis comprising a ring gear support, an annular coupling member connecting the ring gear to the support, interengaging splines on the support and on one end of the member, interengaging splines on the ring gear and on the other end of the support, the two sets of interengaging splines constituting splined connections swingable and shiftable axially of the gear, the support and the member defining a pair of registering circumferential grooves adjacent one connection and the member and the ring gear defining a pair of registering circumferential grooves adjacent the other connection, and arcuate springs extending circumferentially of the member mounted in both pairs of grooves, the springs being sinuous axially of the ring gear and engaging both walls of the grooves.

5. A gear mechanism comprising, in combination, a gear, a support therefor, a member connecting the gear to the support, a swingable connection between the gear and the member, a swingable connection between the member and the support, and resilient means in each said connection operable to locate the connection and yieldable to accommodate shifting of the connection.

6. A gear mechanism comprising, in combination, a gear, a support therefor, a member connecting the gear to the support, a splined connection shiftable axially of the gear between the gear and the member, a splined connection shiftable axially of the gear between the member and the support, and resilient means in each said connection operable to locate the connection axially and yieldable to accommodate axial shifting of the connection.

7. A gear mechanism comprising, in combination, a gear, a support therefor, a member connecting the gear to the support, a splined connection swingable and shiftable axially of the gear between the gear and the member, a splined connection swingable and shiftable axially of the gear between the member and the support, and resilient means in each said connection operable to locate the connection axially and directionally and yieldable to accommodate movement of the connection.

8. A gear mechanism comprising, in combination, a ring gear, a support therefor, an annular coupling member connecting the gear to the support, interengaging splines on the support and on one end of the member, interengaging splines on the gear and on the other end of the support, the two sets of interengaging splines constituting splined connections swingable and shiftable axially of the gear, and resilient locating means at each connection.

9. A gear mechanism comprising, in combination, a ring gear, a support therefor, an annular coupling member connecting the gear to the support, interengaging splines on the support and on one end of the member, interengaging splines on the gear and on the other end of the support, the two sets of interengaging splines constituting splined connections swingable and shiftable axially of the gear, the support and the member each defining a pair of opposed abutments adjacent one connection and the member and the gear each defining a pair of opposed abutments adjacent the other connection, and arcuate springs extending circumferentially of the member at both connections, the springs being sinuous axially of the gear and engaging the abutments.

10. A gear mechanism comprising, in combination, a ring gear, a support therefor, an annular coupling member connecting the gear to the support, interengaging splines on the support and on one end of the member, interengaging splines on the gear and on the other end of the support, the two sets of interengaging splines constituting splined connections swingable and shiftable axially of the gear, the support and the member defining a pair of registering circumferential grooves adjacent one connection and the member and the gear defining a pair of registering circumferential grooves adjacent the other connection, and a number of arcuate springs extending crcumferentially of the member mounted in each pair of grooves, the springs being sinuous axially of the gear and engaging both walls of the grooves.

11. A planetary gear train comprising, in combination, a sun gear mounted with limited freedom for radial movement, a planet carrier mounted on a fixed axis coaxial with the sun gear, a number of planet gears rotatably mounted on the planet carrier and meshing with the sun gear, a ring gear meshing with the planet gears, and means mounting the ring gear with freedom for radial and swinging movement with respect to the said fixed axis, the mounting means including impositive biasing means urging the ring gear to a normal position.

12. A planetary gear train comprising, in combination, a sun gear mounted with limited freedom for radial movement, a planet carrier mounted for rotation about a fixed axis coaxial with the sun gear, a number of planet gears rotatably mounted on the planet carrier and meshing with the sun gear, a ring gear meshing with the planet gears, and means non-rotatably mounting the ring gear with freedom for radial and swinging movement with respect to the said fixed axis, the mounting means including impositive biasing means urging the ring gear to a normal position.

References Cited in the file of this patent
UNITED STATES PATENTS

| | | |
|---|---|---|
| 2,456,572 | Wagstaff | Dec. 14, 1948 |
| 2,577,009 | Frantz | Dec. 4, 1951 |
| 2,591,734 | Smith et al. | Apr. 8, 1952 |
| 2,700,311 | Bade | Jan. 25, 1955 |
| 2,703,021 | Stoeckicht | Mar. 1, 1955 |
| 2,844,052 | Stoeckicht | July 22, 1958 |

FOREIGN PATENTS

| | | |
|---|---|---|
| 503,307 | Germany | Jan. 18, 1929 |
| 609,654 | Germany | Feb. 19, 1935 |
| 890,697 | France | Nov. 8, 1943 |

UNITED STATES PATENT OFFICE

CERTIFICATE OF CORRECTION

Patent No. 2,936,655        May 17, 1960

Victor W. Peterson et al.

It is hereby certified that error appears in the printed specification of the above numbered patent requiring correction and that the said Letters Patent should read as corrected below.

Column 2, line 35, for "rate" read -- race --; line 55, for "adhead" read -- ahead --; column 4, line 14, for "105" read -- 106 --; line 41, for "wtih" read -- with --; line 64, for "axis" read -- axes --.

Signed and sealed this 15th day of November 1960.

(SEAL)
Attest:

KARL H. AXLINE
Attesting Officer

ROBERT C. WATSON
Commissioner of Patents